United States Patent [19]

Wanhem et al.

[11] Patent Number: 5,073,332

[45] Date of Patent: Dec. 17, 1991

[54] DEVICE TO POSITION A DEVICE IN A CYLINDRICAL CAVITY COMPRISING PERFORATION DISPOSED ALONG A REGULAR NETWORK

[75] Inventors: Jean-Pierre Wanhem, St. Genevieve des Bois; Benoît Guillo, Paris, both of France

[73] Assignee: Intercontrole S.A., Rungis Cedex, France

[21] Appl. No.: 516,257

[22] Filed: May 1, 1990

[30] Foreign Application Priority Data

May 16, 1989 [FR] France ................................ 89 06369

[51] Int. Cl.[5] ............................................ G21C 17/00
[52] U.S. Cl. .................... 376/249; 376/262; 376/232; 376/248
[58] Field of Search ............... 376/262, 249, 232, 248, 376/292; 901/44; 444/8, 745.3, 697; 165/11.2, 76; 227/2, 85

[56] References Cited

U.S. PATENT DOCUMENTS

| | | | |
|---|---|---|---|
| 4,216,893 | 8/1980 | Glatthorn | 414/728 |
| 4,653,971 | 3/1987 | Bernardin | 414/8 |
| 4,924,933 | 5/1990 | Richter et al. | 901/44 |

FOREIGN PATENT DOCUMENTS

| | | |
|---|---|---|
| 0276819 | 3/1988 | European Pat. Off. . |
| 3419086 | 11/1985 | Fed. Rep. of Germany . |
| 2566309 | 12/1985 | France . |
| 2093796 | 9/1982 | United Kingdom ........... 901/44 |

OTHER PUBLICATIONS

Nuclear Engineering International, vol. 33, No. 42, Jan., 1988, pp. 27-30.

Primary Examiner—Brooks H. Hunt
Assistant Examiner—Neena Chelliah
Attorney, Agent, or Firm—Pearne, Gordon, McCoy & Granger

[57] ABSTRACT

So as to position a device, such as an eddy current probe support inside a cylindrical cavity with radial perforations opening into said cavity, a device (36) is proposed, said device including a pole (50) orientated parallel to the axis of the cavity. This pole may occupy different pre-established indexing positions in rotation and in translation inside the cavity by means of a mechanism (42, 44, 54, 58, 60). In each of these indexing positions, an active head (98), mounted at the extremity of the pole (50) by means of a pantograph (66) and a cladding arm (100), is able to move in a specific active zone on the lower wall of the cavity. To this effect, the active head is clad by the arm (100) and is equipped with autonomous thrustors controlling its movement.

14 Claims, 8 Drawing Sheets

DEVICE TO POSITION A DEVICE IN A CYLINDRICAL CAVITY COMPRISING PERFORATION DISPOSED ALONG A REGULAR NETWORK

FIELD OF THE INVENTION

The invention concerns a device making it possible to carry out the positioning of a member, such as a guide tube of an eddy current control probe, inside a cylindrical cavity provided with an access opening at at least one of its extremities and in which perforations are formed along a regular network.

BACKGROUND OF THE INVENTION

In nuclear reactors, the transfer of heat between the primary fluid for cooling the core of the reactor and the vaporized water for driving the turbines used to produce electricity is effected by means of steam generators. Inside these steam generators, a bundle of long tubes ensures the heat transfer while avoiding any direct contact between the two fluids.

In certain types of steam generators, the bundle of tubes is placed in a cylindrical casing with a horizontal axis and the extremities of each of the tubes open into two cylindrical collectors with vertical axes and placed inside this casing. Access openings, formed for example at the upper extremities of the collectors, make it possible to gain access to the latter once a plug has been removed.

Because of the corrosive nature of the fluids used to cool nuclear reactors, it is necessary to periodically test the tubes of the bundle, which may be effected, for example, by sending a search gas into each of the tubes or by introducing into these an eddy current probe.

Having regard to the high radioactivity existing inside the collectors of the steam generators, it is preferable to be able to have a device making it possible to remotely position a member, such as a guide tube, through which an eddy current probe is able to be introduced successively opposite each of the perforations opening into this collector.

Such a device, which needs to be relatively easy to implement, must also take account of the fact that, although the perforations are disposed along a regular network, this network most often has discontinuities and some of the perforations have been sealed during a maintenance operation carried out previously. In addition, the spacing between the perforations may vary slightly, due to manufacturing tolerances.

So as to carry out such control operations, there currently exists a device, including a pole disposed along the vertical axis of the collector, which supports a unit designed in such a way as to inject an eddy current probe. Each of the perforations is reached by rotating the pole and by moving the injection unit vertically along this pole.

This known device has a certain number of drawbacks. In the first place, its placing needs to be effected with extreme precision and requires the presence of an additional centering star at the lower extremity of the pole. In addition, even if the device is placed correctly, the irregular nature of the network of perforations necessitates a long and delicate implementation procedure. Those personnel using this device therefore have to undergo special training. Furthermore, the whole device enabling the eddy current probe to be introduced and extracted is placed inside the collector, this not really being desirable, having regard to the radioactive contamination existing inside the latter.

There also exists a large number of devices designed to position a member, such as a guide tube with an eddy current probe, inside the collectors of steam generators with different structures. The tubes inside these collectors are connected onto a horizontal plate with tubes, the collectors being under the plate. A description of these existing devices is contained in the documents EP-A-O 030 484 and FR-A-2 382 986.

In addition, the document FR-A-2 382 986 describes a device having a vertical column taking support respectively on a tube plate and on the wall of the steam generator situated opposite the latter. The column supports a horizontal arrow on which a carriage is able to move, the carriage bearing the member which is to be positioned opposite the tubes. The positioning is obtained by combining a displacement of the carriage along the arrow and a rotation of the column around its own axis.

These existing devices are specifically designed so as to be used in the collectors of steam generators delimited between a horizontal tube plate and a lower hemispherical wall of the steam generator. In no instance may they be transposed to cylindrical collectors provided with perforations opening radially inside these collectors unless they have been considerably modified.

SUMMARY OF THE INVENTION

The object of the invention is to provide a device designed in such a way as to ensure the selected positioning of a member, such as a guide tube, in a cylindrical cavity with perforations opening into said cavity, without the drawbacks of existing devices adapted to cavitities with this shape, and, more particularly, allowing for relatively simple, reliable and rapid implementation.

According to the invention, this result is obtained with the aid of a device to selectively position a member inside a cylindrical cavity with a given axis, said cavity being provided with an access opening at one of its extremities with perforations disposed along a network opening radially into said cavity, wherein it includes a seating provided so as to be secured to said opening and supporting a pole by means of positioning means able to move this pole in rotation and translation between various pre-established indexing positions, the pole being orientated parallel to the axis of the cavity and supporting inside the latter a support block and an active head connected to the support block by an extensible cladding arm provided with extension means which, once implemented, has the effect of simultaneously cladding the support block and the active head against an internal cylindrical wall of the cavity, the active head being equipped with retractable fingers suitable for being introduced into the perforations, means for controlling a movement of the active head in a given working zone of said wall, this wall being different for each of the indexing positions of the pole, and at least one support suitably adapted to receive said member to be positioned.

Advantageously, the support block is mounted on a pantograph joined onto a fixed plate in the pole projection, the extensible cladding arm being pot type joined onto the pantograph close to the support block and onto the active head. The plate also preferably supports a television camera.

According to one preferred embodiment of the invention, the pantograph includes a first arm mounted pivoting at the extremity of the plate furthermost from the pole around an axis perpendicular to the axis of the pole, this first arm bearing the support block at its extremity, and a second arm formed of two segments joined to each other and, via their opposing extremities, onto the plate and, via axes perpendicular to the axis of the pole, onto the first arm, the segments of the second arm occupying a specific aligned position by a stop when the pantograph is deployed, and a folded position when removed from the first arm when the pantograph is folded up.

So that the positioning of the cladding head on the wall is effected relatively easily, this head is advantageously joined onto the cladding arm by a pot type joint only having two degrees of freedom of rotation respectively around a first axis perpendicular to the axis of the pole and to the axis of the cladding arm, and around a second axis perpendicular to the first one and adapted to be orientated parallel to the axis of the pole.

The active head may include two frames adapted to be moved along two directions perpendicular to each other with respect to a central part connected to the extensible cladding arm, each of these frames comprising four retractable fingers. The displacement control means is disposed so as to be able to control a displacement over a distance equal to one pitch of a rectangular network formed by the perforations and along one half-pitch of this network. This structure is adapted to a triangular network formed by the superimposing of two rectangular pitch networks offset by one half-pitch with respect to each other.

BRIEF DESCRIPTION OF THE DRAWINGS

There now follows a description of one preferred embodiment of the invention, given by way of example and being in no way restrictive, with reference to the accompanying drawings in which.

DETAILED DESCRIPTION OF THE PREFERRED EMBODIMENTS

Figure 1:
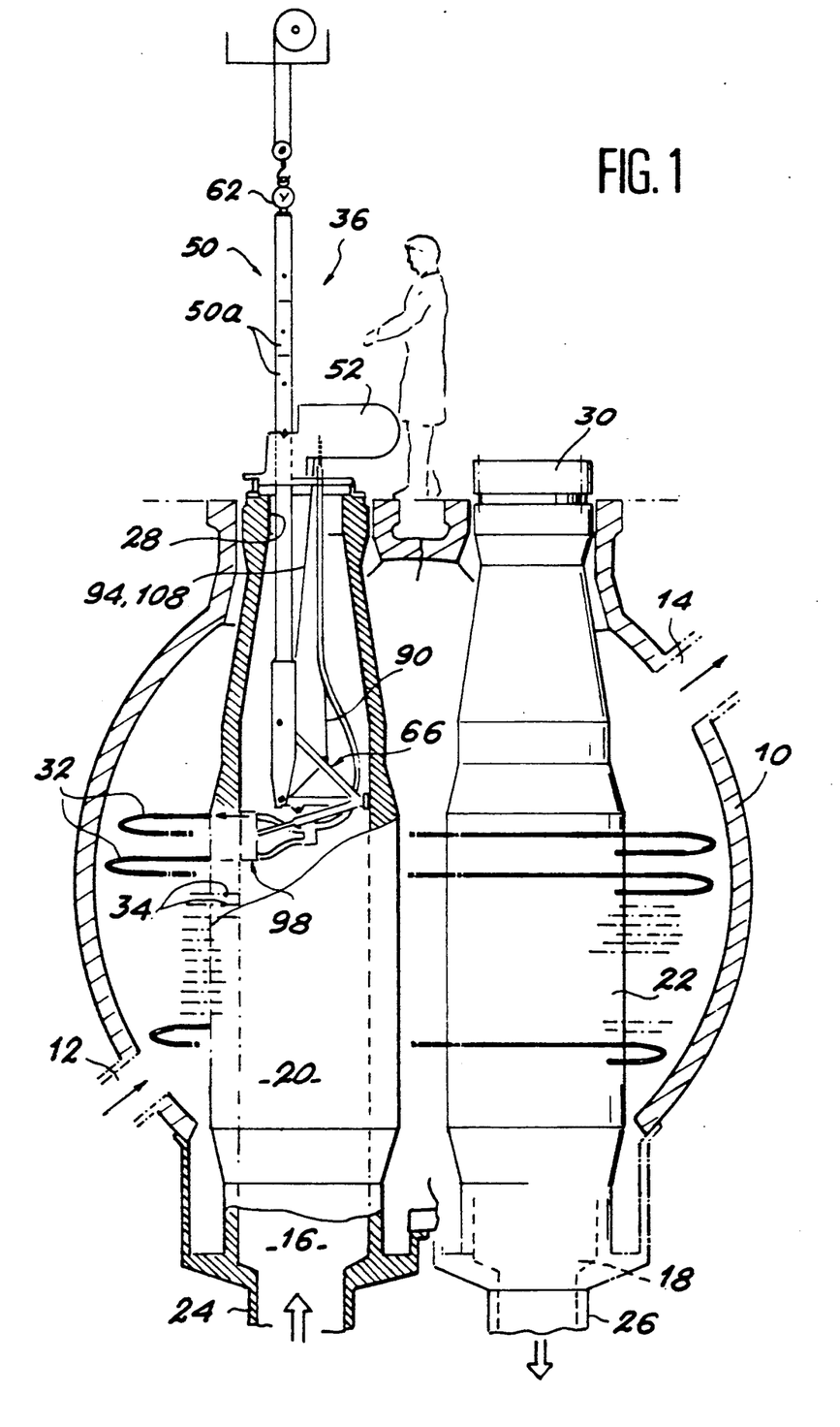
FIG. 1 is a cutaway, transverse view of a steam generator comprising two cylindrical collectors, the device of the invention having been introduced into one of said collectors.

FIG. 1 shows a transverse cutaway view of a steam generator designed so as to be placed between the primary circuit and the secondary circuit of a nuclear reactor. This steam generator includes an outer cylindrical casing 10 with a horizontal axis. This casing 10 is equipped with a secondary water inlet tube in its liquid state and a steam outlet tube represented diagrammatically and denoted respectively by the references 12 and 14 on FIG. 1.

The steam generator illustrated on FIG. 1 further includes inside the casing 10 a primary fluid inlet collector 16 and a primary fluid outlet collector 18. These collectors 16 and 18 have the shape of two cylindrical cavities with vertical axes and are respectively delimited by tubular plates 20 and 22. The lower extremities of each of the collectors 16 and 18 are respectively connected onto the primary circuit of the reactor by tubes 24 and 26. The upper extremity of each of the collectors 16 and 18 comprises a circular access opening 28. When the reactor is in operation, this access opening is normally sealed by a plug 30.

The inlet 16 and outlet 18 collectors communicate with each other via a bundle of tubes 32 placed inside the casing 10 of the steam generator and whose extremities are connected to the tubular plates 20 and 22 of the collectors so as to communicate with the latter by perforations 34 radially traversing the plates 20 and 22.

On FIG. 1, the reference 36 generally denotes a device of the invention and which has been designed in such a way as to successively position, opposite each of the perforations 34 of the tubular plates of the collectors, a member, such as a guide tube, making it possible to introduce into each of these perforations an eddy current probe adapted to control the tubes 32. On FIG. 1, the device 36 is shown installed in the inlet collector 16 of the steam generator. However, given the fact that the two collectors 16 and 18 have the same geometry, the device 36 of the invention could also be introduced into the outlet collector 18.

The device 36 of the invention is now to be described in detail with reference to FIGS. 2 to 6.

Figure 2:
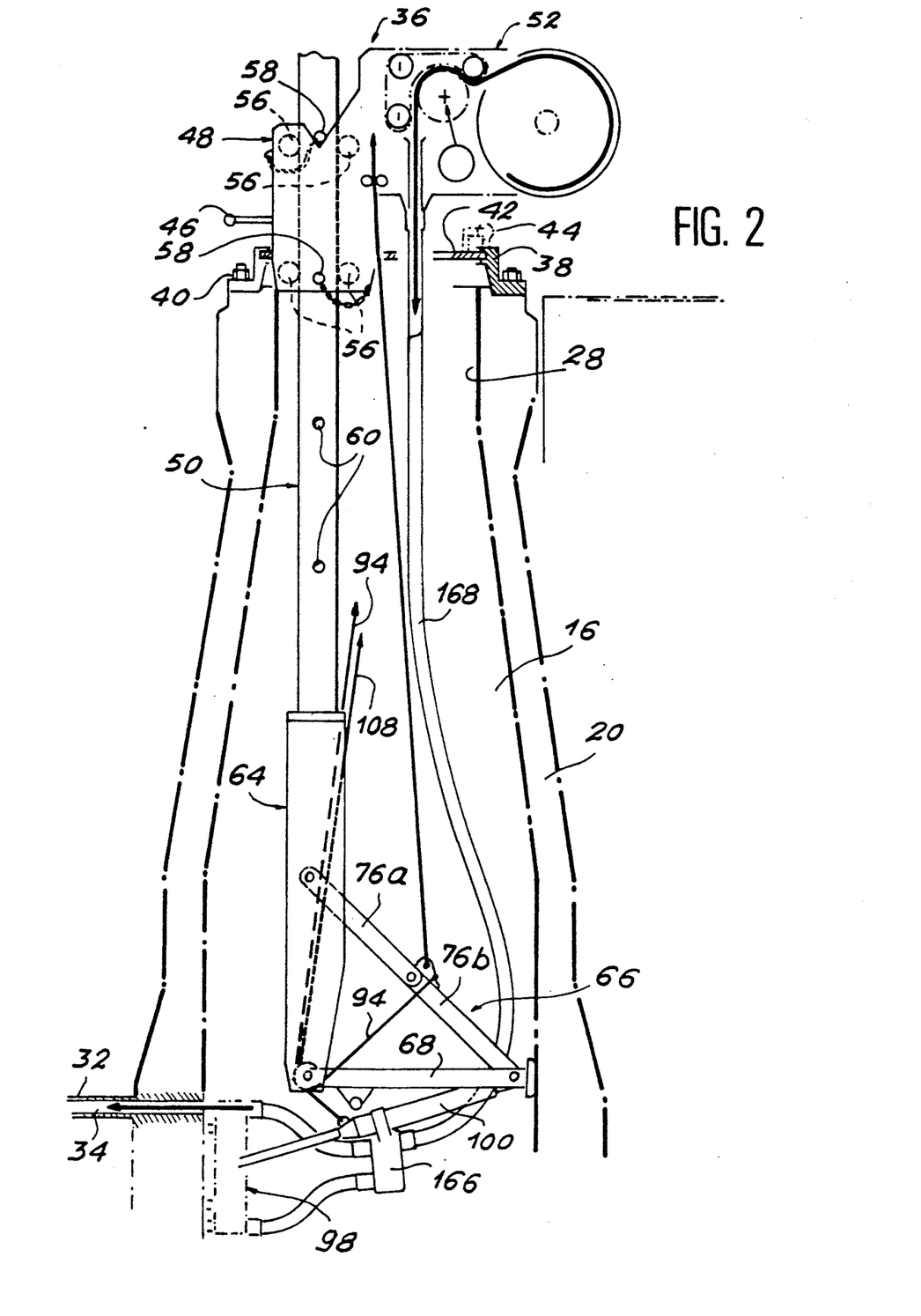
FIG. 2 is a diagrammatic cutaway view on a larger scale of the upper section of the collector, the device of the invention having been introduced into said collector.

As shown on FIG. 2, the device 36 is introduced through the access opening 28 of the collector 16 after the plug sealing this opening has been removed. It includes a seating 38 which is secured to the upper edge of the wall 20 of the collector, for example, by means of bolts 40 used to fix the plug which blocks off operation of the access opening 28.

The seating 38 supports a horizontal rotating plate 42. This plate 42 may occupy various pre-established angular positions with respect to the seating 38. These pre-established positions may be fixed by an indexing mechanism 44 including, for example, a pin which simultaneously traverses the aligned perforations formed in the seating 38 and the rotating plate 42. By way of example being in no way restrictive, four pre-established angular positions offset by 90° with respect to one another may thus be defined. In the embodiment represented, the rotation of the rotating plate 42 is ensured manually by means of an operating handle 46.

The rotating plate 42 supports both a mechanism 48 for the translation guiding of a vertical pole 50 and a pusher-puller device 52 controlling the movements of the eddy current probe inside the tubes 32.

The translation guidance mechanism 48 of the pole 50 includes a box 54 integral with the rotating plate 42 and supporting two sets of rollers 56 offset vertically with respect to each other. The pole 50, having, for example, a circular section, passes between the rollers 56 so as to be able to move vertically along its axis, this axis being parallel and offset with respect to the vertical axis of the collector 16.

The pole 50 may occupy different pre-established heightwise positions with respect to the rotating plate 42. In particular, these pre-established positions may be fixed heightwise by an indexing mechanism of the pole including two pins 58 connected, for example, by chains to the box 54 approximately at the level of each of the sets of rollers 56 so as to be able to be introduced simultaneously into the holes formed in this box 54 and into holes, such as 60, evenly distributed over the entire height of the pole 50.

It is to be noted that the pins 58 also have the effect of immobilizing the pole 50 in rotation with respect to the rotating plate 42. By way of illustration, it shall be observed that the spacing of the holes may, for example, be about 800 mm, which enables the pole 50 to occupy heightwise indexing positions spaced from this distance with respect to one another.

In the case where the device 36 is introduced through an access opening 28 formed in the top part of the collector, as shown on FIGS. 1 and 2, the pole 50 is suspended from a winch (not shown), the maneuvering of this winch enabling the pole to move without effort from one height indexing position to another before the pins 58 are introduced into the holes 60. To this effect and as shown on FIG. 1, the pole 50 is fitted at its upper extremity with a lifting ring 62.

As shown on FIG. 1, the pole 50 may be formed of several sections 50a (three, for example) fixed end to end (that is, on top of each other) according to the position occupied in the collector by the lower extremity of the pole. This characteristic makes it possible to ensure that the pole does not project too high above the collector, especially if the space available at this location is limited.

By means of the rotation indexing mechanism 44 and the translation or height indexing mechanism of the pole 50, constituted by the pins 58 and the holes 60, the lower extremity of the pole may be placed in various pre-established indexing positions inside the collector of the steam generator. In each of these pre-established positions, the part of the device 36 situated at the lower extremity of the pole 50—and which shall now be described—makes it possible to scan a specific working zone of the corresponding tubular plate at a height of, for example, about 800 mm and at an arc of a circle of about 90°. The scanning of this working zone for each of the pre-established indexing positions makes it possible to inspect all the tubular plate of the collector. In practice, it is the extent of the working zone accessible to the part of the device 36 situated at the lower extremity of the pole 50 which determines the spacing between the different possible indexing positions of this pole.

Figure 3:
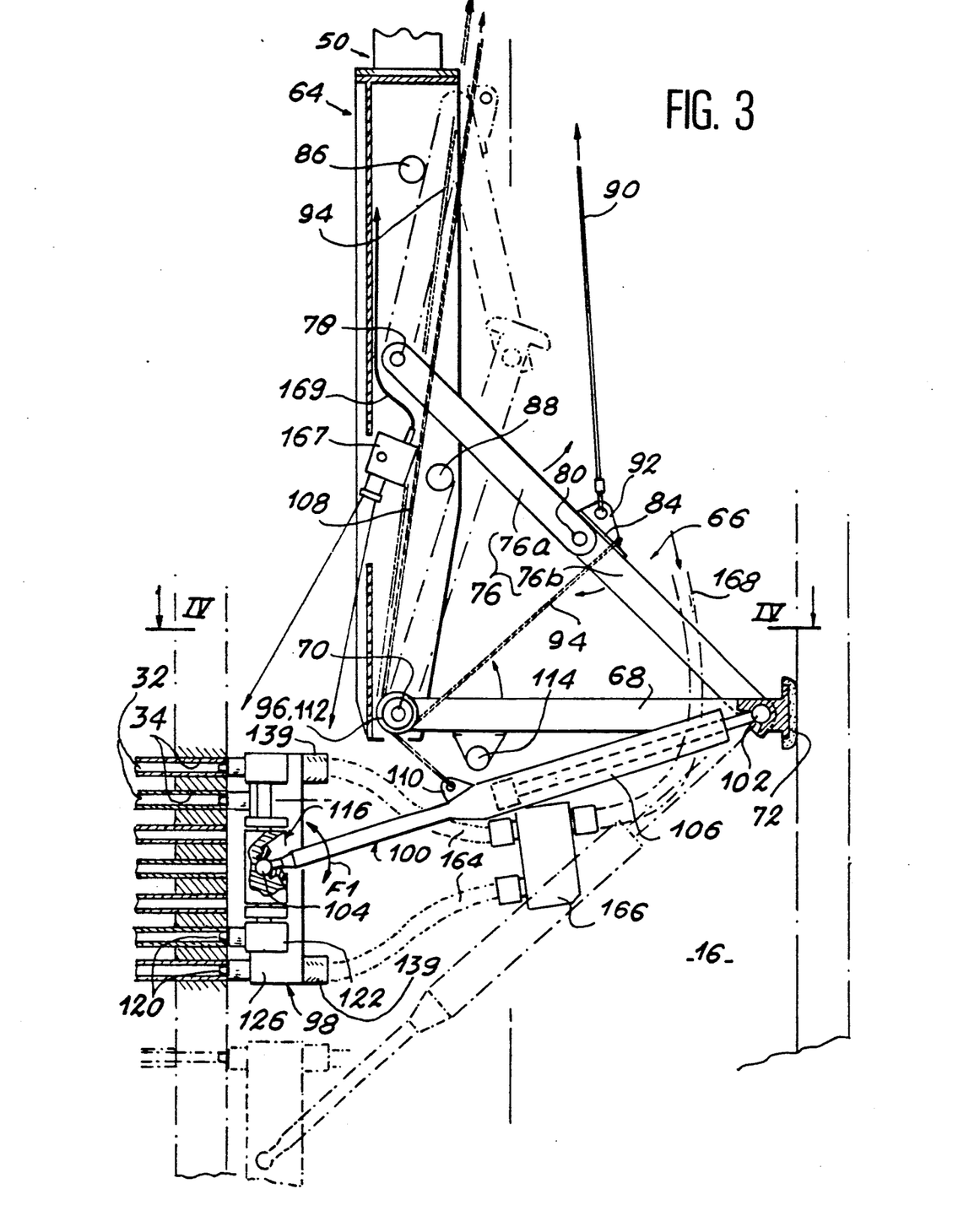
FIG. 3 is a partial cutaway view, again on a larger scale, of the lower section of the device illustrated on FIG. 2.

As shown on larger scale of FIG. 3, a plate 64, having as a horizontal section the shape of a "U" (FIG. 4), is fixed to the lower extremity of the pole 50 in the projection of the latter. A pantograph 66 is joined onto this plate 64. This pantograph 66 includes a lower arm 68 with one extremity being joined around a horizontal spindle 70 onto the lower extremity of the plate 64. At the opposite extremity of the arm 68, a support block 72 is fixed, this block being adapted to come into contact with the tubular plate 20 of the collector 16.

The pantograph 66 further includes an upper arm 74 formed of two articulated segments 76a and 76b. One first extremity of the segment 76a of the arm 76 is joined approximately to the middle of the plate 64 by a horizontal spindle 78 parallel to the spindle 70. The opposing extremity of the segment 76a is joined onto a first extremity of the segment 76b by a horizontal spindle 80 parallel to the spindles 78 and 70. Finally, the opposing extremity of the segment 76b is joined onto the extremity of the arm 68 bearing the block by means of a horizontal spindle 82 (FIG. 4) parallel to the spindles 70, 78 and 80.

As shown on FIG. 3, one of the segments (for example, the segment 76b of the arm 76) bears on its upper edge and its extremity adjacent to the other segment 76a a stop 84 which prevents any folding back towards the arm of the segments 76a and 76b around the spindle 80 when these segments are aligned, as shown by the full line on FIG. 3. In this situation, the arm 68 is virtually horizontal and the pantograph 66 occupies its deployed working or active position. The support block 72 is then immediately close to the tubular plate 20, having regard to the dimensioning of the arm 68.

On the other hand, when the segments 76a and 76b are folded back towards the top around their hinge pin 80, as shown by the dot-and-dash line on FIG. 3, the arm 68 is also folded back towards the top around its spindle 70 and the pantograph 66 occupies a mounting folded position favoring its introduction into the collector and its extraction from the latter. It is to be noted that the "U" section of the plate 64 and the relative dimensioning of the latter and the various arms 68 and 76 forming the pantograph enable the latter to be partly retracted inside the plate when it is in the folded back position. This position is determined by the coming into support of respectively the segment 76a and the arm 68 on stops 86 and 88 mounted to the plate 64.

When the device 36 of the invention is introduced through an access opening 28 formed at the upper extremity of the collector, as shown on FIGS. 1 and 2, the pantograph 66 automatically, by virtue of gravity, occupies its deployed position. However, its introduction into the collector and its extraction from the latter requires that it is possible to remotely control its passage in the folded back position.

In the embodiment shown on FIGS. 2 and 3, this control is effected by means of a cable 90 whose lower extremity is hooked to the extremity of the segment 76b adjacent to the segment 76a, for example by a ring 92 on which the stop 84 is formed. As shown on FIG. 2, the cable 90 is directly connected to the rotating plate 42 which it traverses freely so as to be able to be controlled by an operator situated above the latter and hooked to an anchoring system (not shown) mounted on the plate 42.

With the device illustrated on the figures being provided so as to also be able to be introduced through an access opening formed at the lower extremity of a cylindrical collector with a vertical axis, the deployed position of the pantograph 66 may also be controlled by a remote-controlled activation device.

As shown on FIGS. 2 and 3, this activation device includes another cable 94 whose extremity situated in the collector is also hooked onto the ring 92 and which moves along a pulley 96 (FIG. 4) centered on the spindle 70 before ascending so as to traverse the rotating plate 42 in the same way as the cable 90.

The pantograph 66 supports an active head 98 by means of an extensible cladding arm 100. More precisely, one extremity of the extensible cladding arm 100 is joined onto the arm 68 by a pot type joint 102 or by any equivalent member, such as a cardan joint, immediately behind the block 72. The opposing extremity of the extensible cladding arm 100 is joined onto the active head 98 by a pot type joint 104 only having two degrees of freedom of rotation. These degrees of freedom include one rotation (arrow F1 on FIG. 3) around an axis perpendicular to the axis of the pole 50 and to the axis of the cladding arm 100 (namely, in the plane of FIG. 3) and to one rotation (arrow F2 on FIG. 4) around an axis perpendicular to the previous one and which is orientated parallel to the axis of the pole 50 when the active head 98 is cladded against the tubular plate (that is, one rotation in the plane of FIG. 4). On the other hand, the pot type joint 104 prohibits any rotation around a third axis perpendicular to the previous two axes, namely around an axis orientated radially with respect to the tubular plate when the active head 98 is cladded against the latter. This disposition makes it possible to guarantee a satisfactory automatic positioning of the active head with respect to the tubular plate when the active head is brought into contact with the latter.

To control extension of the extensible cladding arm 100, the latter is equipped with a twin effect thrustor 106 diagrammatically shown on FIG. 3. When this thrustor 106 is activated, the cladding arm 100 applies the active head 98 against the tubular plate which, via a reaction, has the effect of applying the support block 72 against the tubular plate in one section of the latter situated approximately opposite the active head 98. This support of the block 72 makes it possible to ensure a satisfactory cladding of the active head 98 against the tubular plate.

Owing to the presence of the pot type joint 102 by which the extensible cladding arm 100 is joined onto the arm 68 of the pantograph, the active head 98 would tend to fall via gravity if no device were provided to pull the arm 100 to the top when the device is introduced through an access opening formed at the upper extremity of the collector, as shown on FIGS. 1 and 2.

In the embodiment shown on the figures, this device is constituted by a third cable 108 whose lower extremity is hooked to approximately the middle of the extensible cladding arm 100 by a ring 110 and which then moves along a pulley 112 centered, like the pulley 96, on the spindle 70 before ascending to traverse the rotating plate 42 in the same way as the cables 90 and 94.

Figure 4:
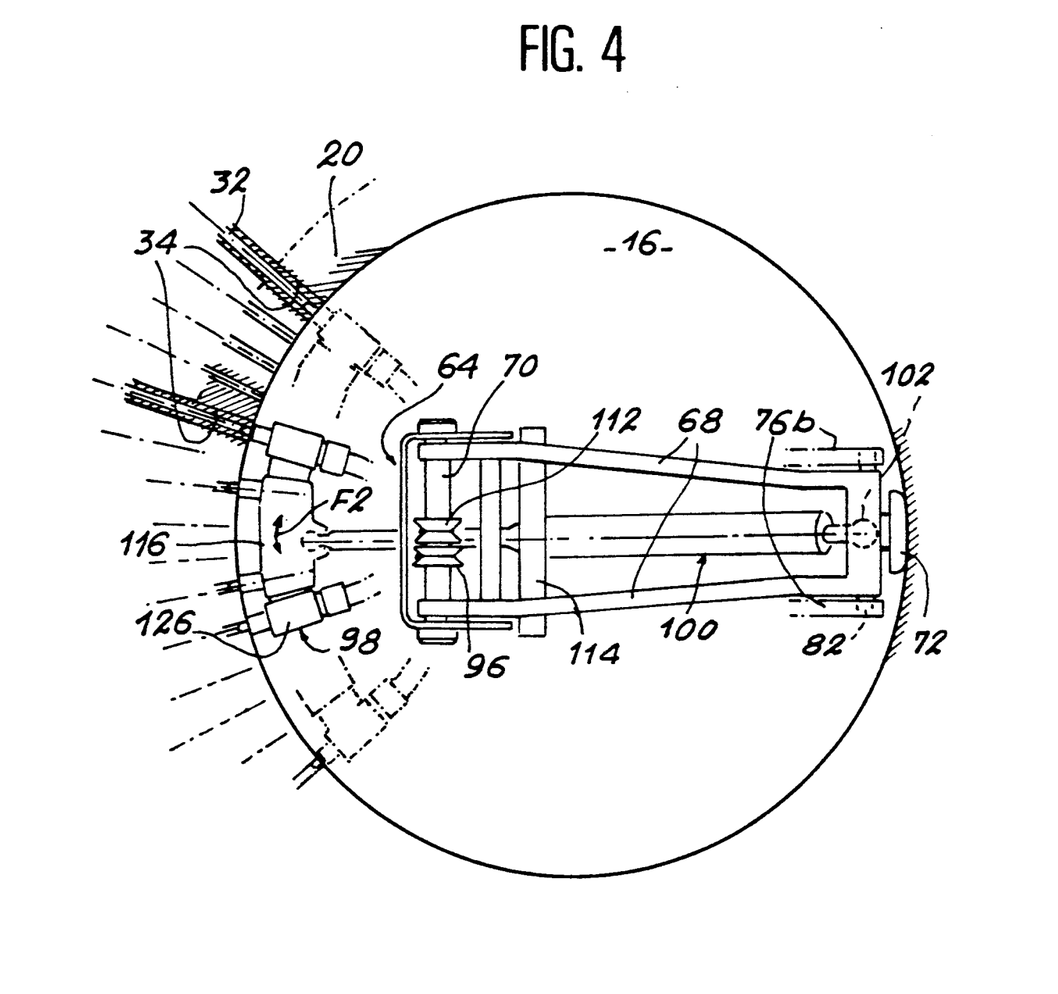
FIG. 4 is a cutaway view along the line IV—IV of FIG. 3.

As shown on FIGS. 3 and 4, a stop 114 borne by the arm 68 of the pantograph limits the clearance of the cladding arm 100 towards the top and also prevents the active head 98 from being able to hit the plate 64. In its limit position towards the top close to the one shown by the full line on FIG. 3, the cladding arm 100 is slightly inclined towards the bottom.

The limit position towards the bottom of the cladding arm 100, shown by the dot-and-dash line on FIG. 3, is determined by the need to apply the active head against the tubular plate with a cladding force equal to at least a limit value, which becomes impossible when the slanting towards the bottom of the arm 100 becomes too steep.

The pot type joint 102 also allows for an angular displacement of the arm 100 on both sides of the vertical median plane of the pole 50 and of the pantograph 66, as shown on FIG. 4.

Thus, the pot type joints 102 and 104 enable the active head to move into a working zone with pre-established dimensions of the tubular plate, this working zone being a curved rectangular zone having a vertical axis of symmetry situated inside the vertical median plane of the pole and of the pantograph with the tubular plate.

Figure 5:
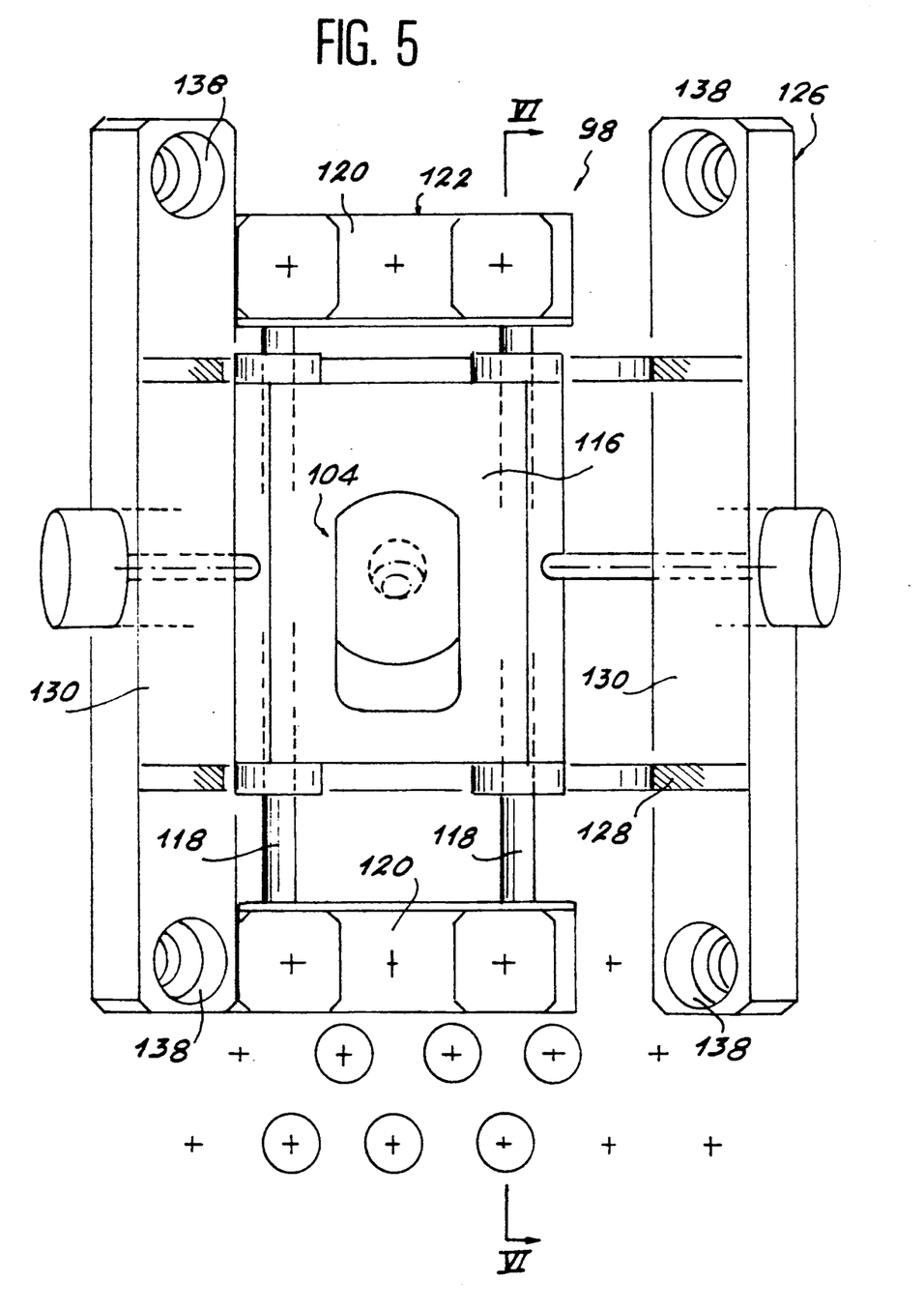
FIG. 5 is a top view of the active head of the device of FIG. 2.
Figure 6:
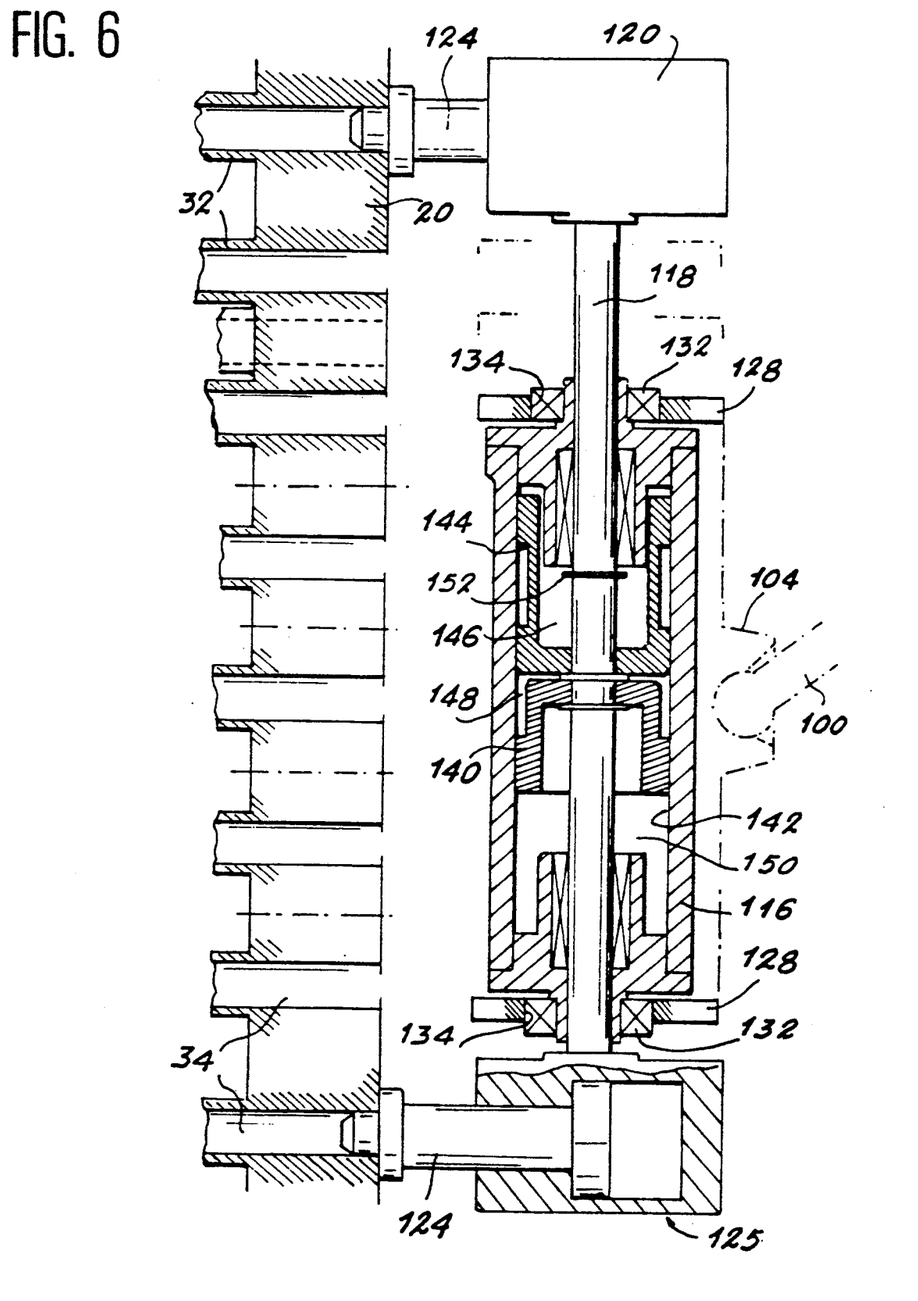
FIG. 6 is a cutaway view along the line VI—VI of FIG. 5.
Figure 7:
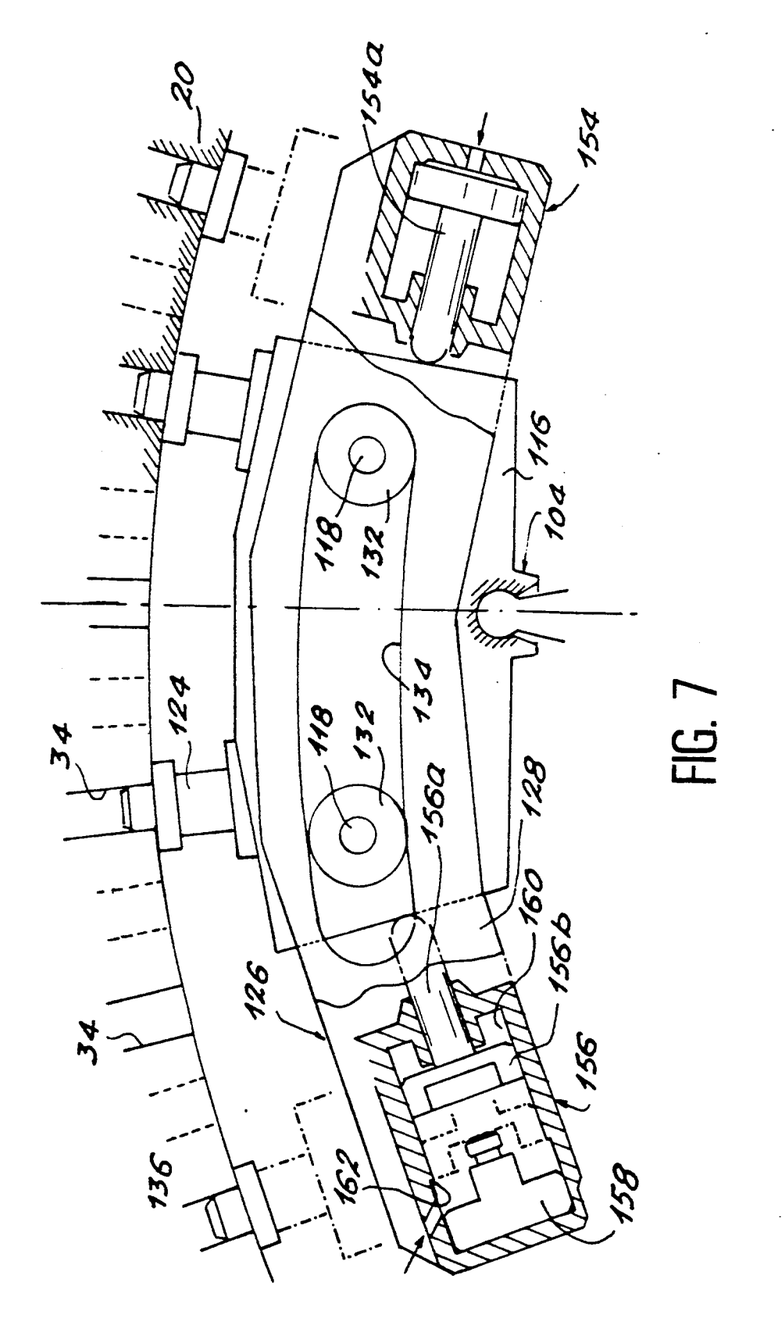
FIG. 7 is a partial cutaway side view of the active head.

As shown in more detail on FIGS. 5 to 7, the active head 98 includes a central part 116, the extremity of the cladding arm 100 being joined to said part by means of the pot type joint 104. This central part 116, which roughly appears rectangular when viewed from the top, supports in sliding fashion two cylindrical rods 118 orientated parallel to two of the sides of the rectangle formed by the part 116. The extremities of the rods 118 are interconnected by two linking parts 120 whose shape approximately follows the curve of the tubular plate and which, along with the rods 118, defines a rectangular frame 122. This frame 122 possesses, with respect to the central part 116 in the direction of the rods 118 orientated parallel to the axis of the collector when the active head is cladded against the tube plate, a travel equal to one pitch in this same direction of the square pitch network(s) formed by the perforations 34. (In the case of a triangular network, the latter is assimilated to two square superimposed pitch networks offset by one half-pitch with respect to each other.)

At each of its angles, the rectangular frame 122 is fitted with fingers 124 whose rounded or truncated extremities are suitably adapted to penetrate the perforations 34 of the plate by automatically centering into the said perforations, even if there is slight offsetting owing, for example, to the machining tolerances of the perforations. Each of the fingers 124 is orientated along a radial direction with respect to the tubular plate when the active head is cladded against the latter and is able to move parallel to its axis between a retracted position and a projecting position under the action of a twin effect thrustor 125 (FIG. 6). Each of these thrustors may be activated independently, which makes it possible to engage only two or three of the fingers 124 in perforations opposite them in the case where certain rows of the network have no perforations or where certain perforations have been sealed.

The active head 98 further includes a second rigid frame 126 comprising two plates 128 parallel to the upper and lower edges of the central part 116 and curved inwards along the curve of the tubular plate. At their extremities, the plates 128 are folded back by linking parts 130 parallel to the lateral edges of the part 116.

As shown clearly on FIGS. 6 and 7, the central part 116 bears on its upper and lower faces rollers 132 whose axes are merged with the axes of the rods 118 and which are symbolized in the form of roller bearings on FIG. 6. The rollers 132 are received in the arc of circle shaped grooves 134 formed parallel to the tubular plate in the plates 128. This disposition enables the rigid frame 126 to move inside a horizontal plane parallel to the tubular plate 20 over a distance equal to one pitch in this same direction of the square pitch network(s) formed by the perforations 34.

The linking parts 130 of the frame 126 extend beyond each of the plates 128 so as to successively support at each of their extremities a finger 136 and a support 138 for the guide tube 139 (FIG. 3).

Just like the fingers 124, the fingers 136 form a rectangle whose sides are multiples of the pitch of the rectangular networks formed by the perforations 34 so that one truncated or tapered extremity of each of these fingers may be introduced simultaneously into perforations opposite the tubular plate 20. The fingers 136 are also orientated radially with respect to the latter when the active head 98 is applied against the tubular plate and each of them may be moved independently of the others along its axis between a retracted position and a projecting position by means of a twin-effect thrustor (not shown).

Each of the supports 138 of the guide tube is spaced by one pitch from the network of perforations with respect to the adjacent fingers 136 so that the guide tubes 139 are placed opposite four perforations of the tubular plate 20 when the fingers 136 are engaged in other perforations of this same plate.

Control for the relative displacement between the frame 122 and the central part 116 parallel to the axes of the rods 118 is ensured by two twin-effect thrustors housed in the part 116 around the rods 118, as shown on FIG. 6. Each of these thrustors includes a central partition seal-linked to the rod 118 and received in a sealed way in a bore 142 formed in the part 116. A piston 144 is also housed between the partition 140 and one of the closed extremities of the bore 142 so as to be able to slide freely in a sealed way around both the rod 118 and inside the bore 142. Compressed air intake tubes (not shown) open into the three chambers 146, 148 and 150 respectively formed between the piston 144 and the adjacent extremity of the bore 142, between the piston 144 and the partition 140 and between the latter and the other extremity of the bore 142. In addition, the rod 118 in the chamber 146 bears a stop 152.

In the disposition described above, the relative displacement between the frame 122 and the central part 116 is normally obtained by injecting compressed air, either into the chamber 146, or into the chamber 150 along the direction of the displacement to be effected. In both cases, a displacement is then obtained equal to one pitch.

When it is desired to pass from one rectangular pitch network to another rectangular pitch network offset by one half-pitch with respect to the first network (which makes it possible to use the device on a tubular plate having a triangular pitch network equivalent to two superimposed rectangular pitch networks), compressed air is injected into the chamber 148. The relative displacement between the frame 122 and the central part 116 is then limited to one half-pitch by virtue of the piston 144 coming into support on the stop 152.

Control of the relative displacement between the frame 126 and the central part 116 parallel to the axes of the arc of circle-shaped grooves 134 formed in the plates 128 is ensured by two thrustors 154 and 156 mounted in opposition on both sides of the central part 116 at the center of each of the linking parts 130, as shown on FIG. 7. The thrustor 154 in one single action acts on the corresponding lateral face of the part 116 by means of a rod 154a. The thrustor 156 is also a single-action thrustor which acts on the opposing lateral face of the central part 116 by means of a rod 156a. Control of either of the thrustors 154 and 156 makes it possible to carry out a relative displacement of one pitch between the central part 116 and the frame 126.

To allow for passage of the active head 98 of one rectangular network to another offset by one half-pitch in the circumferential direction defined by the arc of circle-shaped grooves 134, the thrustor 156 further includes behind its piston linked to the rod 156a a second piston 158 which normally remains cladded against the bottom of the bore 160 containing the pistons 156b and 158. This piston 158 has a travel limited to one half-pitch by a shoulder 162 formed in the bore 160. As a result, when compressed air is injected behind the piston 158, a relative displacement of one half-pitch is effected between the part 116 and the frame 126 along the aforesaid circumferential direction.

With reference again to FIG. 3, it can be seen that the flexible tubes 164 connect each of the guide tubes 139 to a selector 166 with pneumatic control, which makes it possible to connect at will each of the tubes 164 with the flexible tube whose opposing extremity is connected to the pusher/puller device 52, as shown on FIG. 2. So as to take into account the height differences of the active head 98 inside the collector, the tube 168 is preferably made up of several sections, the number of these sections being modified according to the position of the active head in the collector.

To allow for satisfactory positioning of the fingers 120 of the active head roughly opposite the perforations 34 of the tubular plate when a new zone of the latter needs to be inspected, a television camera 167 is mounted on the plate 64 and orientated towards the active head. This camera 167 is connected by a cable 169 to an external display system, such as a television screen (not shown).

The functioning of the device of the invention is now to be described with reference to FIGS. 1 to 4.

When the tubes of the steam generator need to be inspected, the cover sealing one of the collectors 16 and 18 is removed. The introduction of the pantograph 66 and the active head 98 is effected by keeping the pantograph in the folded back position by means of the cable 90 and by releasing the cable 94 so that the active head and the extensible arm 100 are suspended by gravity. The seating 38 is placed on the upper face of the opening 28 and fixed, for example, with bolts 40. Throughout these operations, the pole 50 is suspended from a winch and the pins 58 are placed in the corresponding holes 60.

When the seating 38 has been secured, the pole 50 is translation and rotation indexed in a first position determining a first tubular plate inspection zone. Then the pantograph 66 is deployed by releasing the cable 90 by applying a certain tension to the cable 94 so as to keep the active head 98 close to the wall of the tubular plate. The operator than activates the thrustor 106 of the extensible cladding arm 100 so as to bring the fingers 120 against the wall of the tubular plate. During this operation, the operator positions the fingers 120 opposite the perforations 34, by virtue of the image provided by the camera 167, by acting on the cable 108. When a roughly satisfactory positioning is obtained, a much greater force is applied by the thrustor 106 so that the fingers 120 are automatically centered in the perforations 34. By reaction, the block 72 is also applied against the wall of the tubular plate, which determines a point of support making it possible by using a sufficient force to permanently clad the active head 98 against the tubular plate.

The active head 98 is then in a position to control the perforations in one zone of the tubular plate extending over a height and a circumferential portion with predetermined values. For each position of the active head 98, four controls may be carried out by successively injecting the eddy current control probe associated with the pusher-puller device 52 into the four perforations opposite the guide tubes 122, which is able to be effected by means of the selector 126.

When the controls have been carried out, the thrustors controlling displacement of the active head 98 are activated so as to move the latter by one pitch, either horizontally or vertically. A new series of controls may then be carried out. The control of all the accessible perforations for a given position of the pole 50 is continued in this way by successively carrying out the control of the perforations disposed along the two rectangular pitch networks determining one triangular pitch network when the perforations 34 are formed along a triangular pitch network. As the active head 98 progressively moves, it remains applied against the tubular plate by virtue of the thrustor 106 of the extensible cladding arm 100.

At the time it is moving, when the active head 98 encounters zones of the tubular plate without any perforations or zones in which certain perforations have been sealed, this displacement occurs without difficulty by virtue of the possibility to individually control each of the fingers 120 of the active head.

When the control of one accessible tubular plate zone without any displacement of the pole 50 has been completed, the thrustor 106 is released and the cable 108 is partly freed so that the active head is again spaced from the tubular plate in the same way as the block 72. The pole 50 is then brought, either by one rotation of the plate 42 or by one translation of this pole, to another indexing point different from the previous point. A new tubular plate zone may then be controlled.

By thus moving the pole 50, both vertically and in rotation so as to have it occupy the various preestablished indexing points and by carrying out for each of these indexing points a control of the accessible tubular plate zone by the active head 98, the control of all the perforations existing in this plate is simply effected without any operator using the device needing to be specially trained and without any manufacturing tolerances and defects existing in the network of perforations adversely affecting quality of the control.

Figure 8:
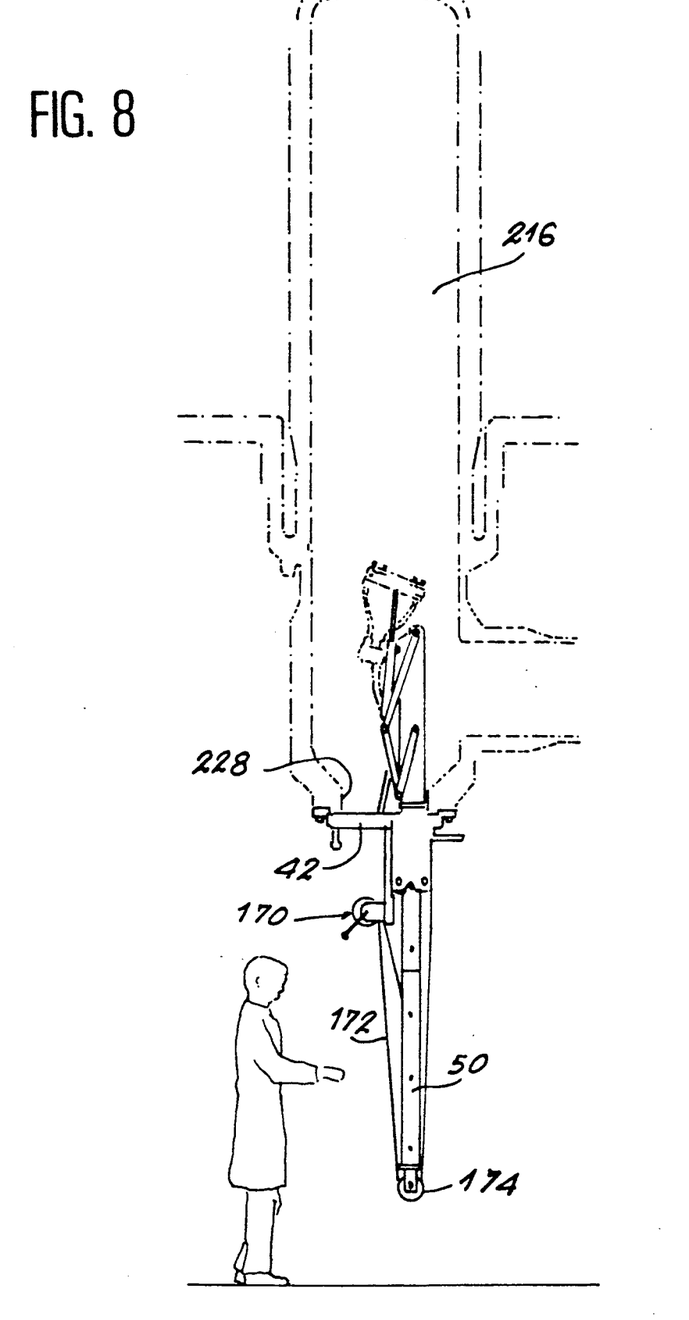
FIG. 8 is a view diagrammatically representing the introduction of the device of the invention through an access opening formed at the lower extremity of the vertical cylindrical collector.

As shown diagrammatically on FIG. 8, the device described above may also be used to gain access to a collector 216 accessible via the access opening 228 formed in the arm of this collector. The functioning of the device is then virtually identical to that of the one just described. However, instead of being supported by a winch placed above the pole 50 as in the preceding application, the weight of the pole 50 and of members borne by the latter is supported by a winch 170 secured to the rotating plate 42 and on which a cable 172 is wound passing through a pulley 174 mounted at the lower extremity of the pole 50 before ascending along the pole so as to be secured by its opposing extremity to the plate 42.

Moreover, the operations for deployment of the pantograph 66 are effected by acting on the cable 94 and not by gravity.

Of course, the invention is not merely restricted to the embodiment described above given by way of example, but also covers all its variants.

Thus, when the device of the invention is provided so as to be solely used in collectors having an upper access opening, the cable 94 can be suppressed. Furthermore, the manual mechanisms making it possible to control the rotation displacements of the plate 52 and translation displacements of the pole 50 could be replaced by motorized systems.

More generally, it is important to stress that the device of the invention is not merely restricted to the particular application described above and may be used each time it is desired to remotely position any member inside a cylindrical cavity with perforations opening into the latter, regardless of the slope of the axis of the cavity and irrespective of the nature of the member to be positioned (control device, tooling, etc).

What is claimed is:

1. Device to selectively position a member in a cylindrical cavity, said cylindrical cavity being defined within an inner cylindrical wall, and having a given longitudinal axis and providing an access opening at one of its extremities, said inner cylindrical wall providing perforations disposed along a network which radially open into said cavity, said perforations being generally directed towards said longitudinal axis of said cavity, this device including a seating provided to be secured to said opening and supporting a pole by means of positioning means, said positioning means enabling the pole to be moved in rotation and in translation between various pre-established indexing positions, the pole being orientated parallel to the axis of the cavity and supporting inside the latter a support block and an active head connected to the support block by means of an extensible cladding arm provided with extension means which, when implemented, have the effect of simultaneously cladding the support block and the active head against the inner cylindrical wall of the cavity, the active head being equipped with retractable fingers adapted to be introduced into the perforations, means for controlling a movement of the active head in a given working zone of said wall, this zone being different for each of the pole indexing positions, and at least one support suitable for receiving said member to be positioned.

2. Device according to claim 1, wherein the support block is mounted on a pantograph joined onto a plate fixed in the projection of the pole, the extensible cladding arm being pot type joined onto the pantograph close to the support block and joined onto the active head.

3. Device according to claim 2, wherein the plate also supports a television camera.

4. Device according to claim 2, wherein the pantograph includes a first arm mounted and pivoting at the extremity of the plate furthermost from the pole around an axis perpendicular to the axis of the pole, this first arm bearing said support block at its extremity, and a second arm formed of two interjoined segments and, by their opposing extremities, onto the plate and, by axes perpendicular to the axis of the pole, onto the first arm, the segments of the second arm occupying an aligned position determined by a stop when the pantograph is deployed and a folded position distanced from the first arm when the pantograph is folded back.

5. Device according to claim 4, wherein the opposing extremities of the second arm are respectively joined to approximately the middle of the plate and to the extremity of the first arm bearing the block.

6. Device according to claim 4, wherein the device being provided so as to be used in a cavity with an approximately vertical axis, means are provided for the remote control of the pantograph, said means including at least one cable anchored to the second arm close to the joint connecting the segments forming this second arm.

7. Device according to claim 6, wherein the device being provided so as to be introduced indifferently by upper and lower access openings, means are provided for the remote control of the pantograph, said means including two cables, one of which is directly connected to the outside of the cavity, the other being connected to the outside of the cavity by passing through a pulley centered on the hinge pin of the first arm on the plate.

8. Device according to claim 4, wherein the device being provided so as to be introduced through an upper access opening into a cavity with an approximately vertical axis, the extensible cladding arm is connected to the outside of the cavity by a slope control cable moving on a pulley centered on the hinge pin of the first arm on the plate.

9. Device according to claim 1, wherein the means for extending the extensible cladding arm include a thrustor.

10. Device according to claim 1, wherein the active head is joined onto the cladding arm by a pot type joint having only two degrees of freedom of rotation respectively around a first axis perpendicular to the axis of the pole and to the axis of the cladding arm and around a second axis perpendicular to the first axis and suitable for being orientated parallel to the axis of the pole.

11. Device according to claim 1, wherein the pole is formed of several sections fixed end-to-end.

12. Device according to claim 1, wherein the positioning means include a rotating plate mounted on the seating and means for the rotation indexing of the rotating plate with respect to the latter.

13. Device according to claim 12, wherein the positioning means further include guidance means authorizing a translation of the pole with respect to the rotating plate along a direction parallel to the axis of the cavity, and means for the translation indexing of the pole with respect to the rotating plate.

14. Device according to claim 1, wherein the active head includes two frames suitable for being moved along two directions perpendicular to each other with respect to a central part to which the extensible cladding arm is connected, each of these frames including four retractable fingers, said displacement control means being disposed so as to be able to control a movement over a distance equal to one pitch of a rectangular network formed by the perforations and to one half-pitch of this network.

* * * * *

UNITED STATES PATENT AND TRADEMARK OFFICE
CERTIFICATE OF CORRECTION

PATENT NO.   :   5,073,332

DATED        :   December 17, 1991

INVENTOR(S)  :   Jean-Pierre Wanhem and Benoit Guillo

It is certified that error appears in the above-identified patent and that said Letters Patent is hereby corrected as shown below:

On the title page, item [54], line 3, "PERFORATION" should be --PERFORATIONS--;

Column 1, line 4, "PERFORATION" should be --PERFORATIONS--;

Column 2, line 12, "taking support" should be --supported--.

Signed and Sealed this

Sixth Day of July, 1993

Attest:

MICHAEL K. KIRK

Attesting Officer

Acting Commissioner of Patents and Trademarks